(12) United States Patent
Ravoux et al.

(10) Patent No.: US 9,249,874 B2
(45) Date of Patent: Feb. 2, 2016

(54) ELECTROMECHANICAL ACTUATOR WITH ANTI-BLOCKING MEANS

(71) Applicant: SAGEM DEFENSE SECURITE, Boulogne Billancourt (FR)

(72) Inventors: Nicolas Ravoux, Boulogne Billancourt (FR); Benjamin Vallee, Boulogne Billancourt (FR)

(73) Assignee: SAGEM DEFENSE SECURITE, Boulogne Billancourt (FR)

(*) Notice: Subject to any disclaimer, the term of this patent is extended or adjusted under 35 U.S.C. 154(b) by 0 days.

(21) Appl. No.: 14/424,293

(22) PCT Filed: Sep. 13, 2013

(86) PCT No.: PCT/EP2013/069067
§ 371 (c)(1),
(2) Date: Feb. 26, 2015

(87) PCT Pub. No.: WO2014/041143
PCT Pub. Date: Mar. 20, 2014

(65) Prior Publication Data
US 2015/0323055 A1   Nov. 12, 2015

Related U.S. Application Data

(60) Provisional application No. 61/701,391, filed on Sep. 14, 2012.

(51) Int. Cl.
*F16H 1/28* (2006.01)
*F16H 57/025* (2012.01)
*H02K 7/112* (2006.01)
*B64C 13/42* (2006.01)
*F16H 57/02* (2012.01)

(52) U.S. Cl.
CPC .............. *F16H 57/025* (2013.01); *B64C 13/42* (2013.01); *F16H 1/28* (2013.01); *H02K 7/112* (2013.01);
(Continued)

(58) Field of Classification Search
CPC .......... F16H 1/2818; F16H 2001/2881; F16H 2057/02082; F16H 2057/02034; H02K 7/112; B64C 13/42
USPC .......................... 475/154, 156, 317, 341, 342
See application file for complete search history.

(56) References Cited

U.S. PATENT DOCUMENTS

| 4,360,999 A | * | 11/1982 | Seyerle | .............. A01D 34/6812 |
| | | | | 192/216 |
| 5,133,698 A | * | 7/1992 | Hermans | .................. B64C 13/34 |
| | | | | 475/332 |

(Continued)

FOREIGN PATENT DOCUMENTS

| DE | 198 10 592 A1 | 7/1999 |
| DE | 101 17 934 A1 | 10/2002 |
| EP | 1 653 033 A2 | 5/2006 |

*Primary Examiner* — Roger Pang
(74) *Attorney, Agent, or Firm* — Muncy, Geissler, Olds & Lowe, P.C.

(57) ABSTRACT

An electromechanical actuator comprising a frame having mounted thereon a rotary motor and a gear train having an inlet shaft lying on the same axis as an outlet shaft of the motor and connected thereto, and an outlet ring coaxial with the outlet shaft of the motor and connected to a lever for operating a member that is to be driven. The gear train is carried by a casing mounted on the frame to pivot about the axis of the outlet shaft of the motor. An anti-blocking device is mounted on the frame and comprises a movable element that is movable between a blocking position for blocking the casing in rotation relative to the frame, and a release position for releasing the casing in rotation relative to the frame.

7 Claims, 3 Drawing Sheets

(52) U.S. Cl.
CPC ....... *F16H 1/2818* (2013.01); *F16H 2001/2881* (2013.01); *F16H 2057/02034* (2013.01); *F16H 2057/02082* (2013.01)

(56) References Cited

U.S. PATENT DOCUMENTS

| | | | |
|---|---|---|---|
| 5,171,195 A * | 12/1992 | Funamoto | F16H 1/46 475/265 |
| 5,518,466 A * | 5/1996 | Tiedeman | B64C 13/34 475/339 |
| 5,779,587 A * | 7/1998 | Reilly | B64C 13/28 192/150 |
| 5,967,934 A * | 10/1999 | Ishida | F16H 3/66 475/269 |
| 8,133,143 B2 * | 3/2012 | Schoon | H02K 7/1025 180/371 |
| 2006/0211534 A1 * | 9/2006 | Roberts | B25B 21/00 475/317 |

\* cited by examiner

ELECTROMECHANICAL ACTUATOR WITH ANTI-BLOCKING MEANS

The present invention relates to an electromechanical actuator, e.g. suitable for use in the field of aviation in order to more a movable flight control surface relative to a stationary structure of an aircraft. By way of example, the flight control surface may be a rudder, an aileron, an elevon, a flap, etc.

Electromechanical actuators are known that are mounted on board aircraft and that comprise a frame having a rotary motor mounted thereon together with a screw that is mounted to slide relative to the frame. The motor acts via stepdown gearing to drive rotation of a nut that is mounted on the screw, while being prevented from moving in translation relative to the frame. The frame is fastened to the structure of the aircraft and rotating the nut thus causes the screw to move in translation, with one end of the screw being connected to the flight control surface that is to be moved.

For safety reasons, two actuators are generally provided for each flight control surface that is to be moved, with each actuator being dimensioned so as to be capable of acting on its own to move the surface that is to be moved. Thus, in the event of one of the actuators failing, the other actuator is used to move the control surface and thus ensure that the aircraft can continue to operate.

Nevertheless, a problem can arise in the event of the faulty actuator seizing and opposing any movement of the control surface. In order to avoid this risk, it is common practice to interpose a torque limiter between the actuator and the control surface so as to enable the control surface to be decoupled from the faulty actuator when the force exerted by the control surface on the faulty actuator reaches a predetermined threshold. Nevertheless, that arrangement is relatively bulky since it tends to require the actuator to be further away from the control surface.

An object of the invention is to provide simple means for avoiding, at least in part, the problems of actuators blocking.

To this end, the invention provides an electromechanical actuator comprising a frame having mounted thereon a rotary motor and a coaxial gear reducer having as an inlet an outlet shaft of the motor and as outlets a first element of an anti-blocking system and a ring coaxial with the outlet shaft of the motor and connected to a lever for operating a member that is to be driven. The gear reducer is carried by a casing mounted on the frame to pivot about the axis of the outlet shaft of the motor. The anti-blocking device is mounted on the frame and comprises a second element that is movable between a blocking position for blocking the first element in rotation relative to the frame, and a release position for releasing the first element in rotation relative to the frame.

Thus, in the event of the actuator blocking, it is possible to release the first element in rotation so as to allow the lever to oscillate freely.

Preferably, the gear reducer is an epicyclic or compound gear train and the first element has an annular portion with internal teeth for forming a stationary element of the gear reducer.

The gear reducer thus forms a compact differential gear reducer and if blocking occurs in the motor, the outlet ring can pivot as a result of releasing the first element that formed a stationary point relative to the frame.

Other characteristics and advantages of the invention appear on reading the following description of particular, non-limiting embodiments of the invention.

Reference is made to the accompanying drawings, in which.

Figure 1:
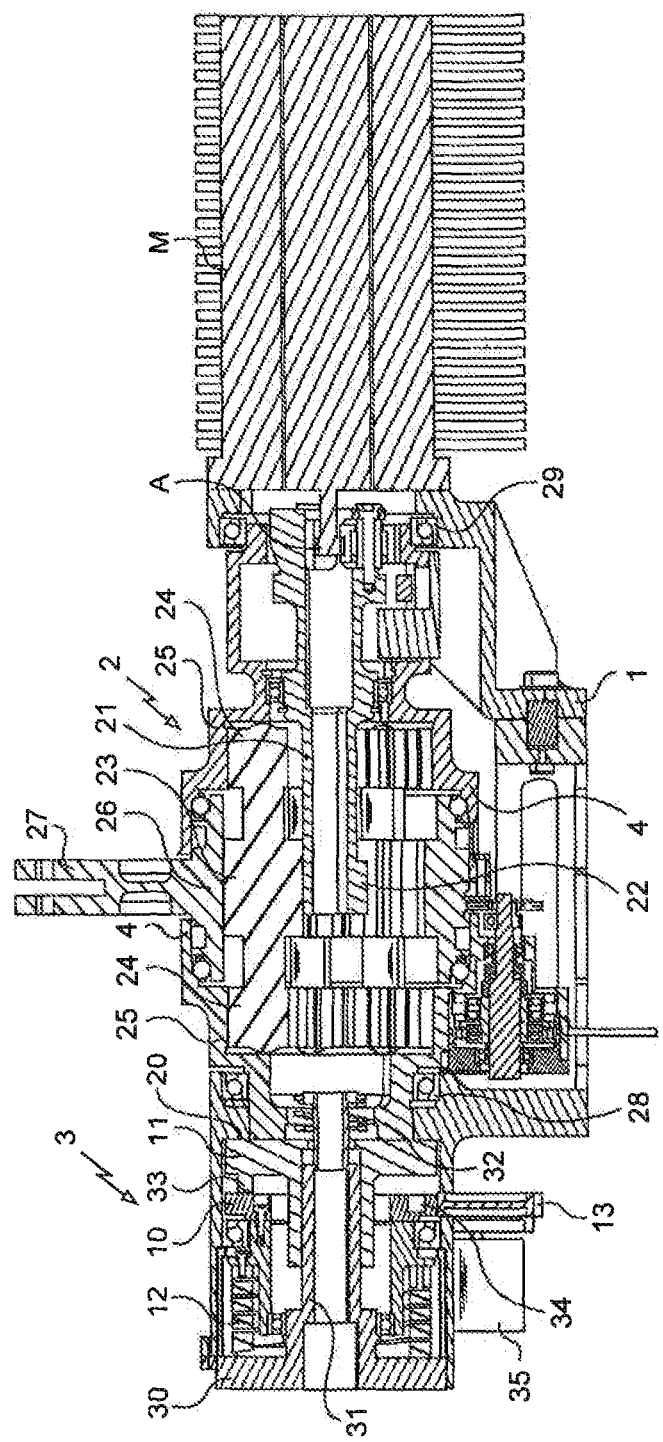
FIG. 1 is a longitudinal section view of an actuator in accordance with the invention.

With reference to the figures, the electromechanical actuator of the invention is a rotary actuator for use in this embodiment to move a movable member, such as an aircraft control surface, relative to a stationary structure, such as the wing of the aircraft.

The actuator comprises a frame 1 provided with means for fastening it to the structure, such as holes for receiving fastener bolts.

The frame 1 has mounted thereon:

an electric motor M;
a gear train or reducer given overall reference 2; and
an anti-blocking device given overall reference 3.

The motor H is an electric motor having a stator fastened on the frame 1 and a rotor connected to rotate with an outlet shaft A of the motor M.

The gear reducer 2 in this embodiment is of the compound type, and comprises a casing 4 forming a first element of the anti-blocking device 3, made up of two portions in this example, in which there extends an inlet shaft 21 that is on the same axis as the outlet shaft A of the motor M and that has one end constrained to rotate with the outlet shaft A of the motor M and an opposite end provided with a gear 22 meshing with intermediate gearwheels 23, each mounted on a respective shaft carrying gearwheels 24 meshing with toothed annular portions 25 of the casing 4. The intermediate gearwheels 23 also mesh with an outlet ring 26 having internal teeth and provided on the outside with a lever 27 for operating the control surface that is to be moved. The outlet ring 26, the gearwheels 23, 24, and the inlet shaft 21 are mounted to pivot relative to the casing 4. The toothed annular portions 25 of the casing 4 thus form stationary intermediate rings of the gear train 2.

The casing 4, and thus the gear train 2 as a whole, is mounted on the frame 1 via two bearings shown symbolically at 28 and 29. Each of the bearings 28, 29 may be a single bearing, e.g. formed as a single ball bearing, or it may be a double bearing, e.g. formed by an inner ball bearing and an outer ball bearing coaxial therewith. A double bearing presents the advantage that seizing of one of the two ball bearings in the double bearing does not prevent the casing 4 from pivoting relative to the frame 1. The double bearing could also comprise a single ball bearing having an inside or outside surface with a low coefficient of friction that is suitable for sliding relative to the element with which that surface is in contact.

Under normal conditions, the anti-blocking device 3 is arranged to prevent the casing 4 from rotating relative to the frame 1, and also, in the event of the motor M or the gear train 2 blocking, to allow the casing 4 to rotate relative to the frame 1.

For this purpose, the anti-blocking device 3 is received in a housing in the frame 1 that is situated on a side of the frame 1 remote from the motor M so that the gear train 2 lies between the motor M and the anti-blocking device 3. The anti-blocking device comprises a cover 30 that closes the housing in the frame 1 and that includes a projection on one face from which there extends a support shaft 31 lying on the same axis as the outlet shaft S of the motor M and carrying an element (which is a second element of the anti-blocking device) that is movable to slide between a position for blocking the casing 4 in rotation relative to the frame 1 and a position for releasing the casing 4 to rotate relative to the frame 1.

Figure 5:
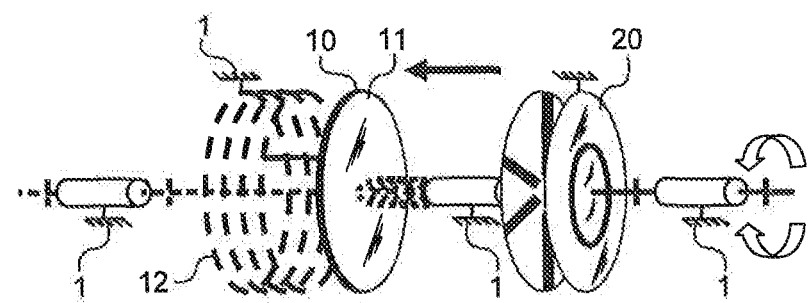

The movable element is a clutch plate 11 that is stationary in rotation, having a front face forming a friction face 20 that is pressed against both a surface of the casing 4 and also a surface of the frame 1 so as to constrain them together in rotation when the movable element is in the blocking position (FIGS. 1 to 4) and that is moved away from the frame 1 and the casing 4 when the clutch plate 11 is in the release position (FIG. 5). The clutch plate 11 is urged towards the release position by a resilient return element, in this example a helical spring 32 extending around the support shaft 31 between the friction surface 20 and a shoulder on the free end of the support shaft 31.

The anti-blocking device 3 includes a holder element for holding the clutch plate 11 in the blocking position against the force exerted by the helical spring 32. The holder element comprises a female plate 10 mounted on the support shaft 31 to pivot about said support shaft 31 between a first position in which spacers 33 projecting axially from the rear face of the clutch plate 11 hold the clutch plate 11 spaced apart from the female plate 10 (FIGS. 1 to 3), and a second position in which the spacer 33 is received in housings 34 in the female plate 10 so that the clutch plate 11 and the female plate 10 are close to each other (FIG. 5).

Figure 2:
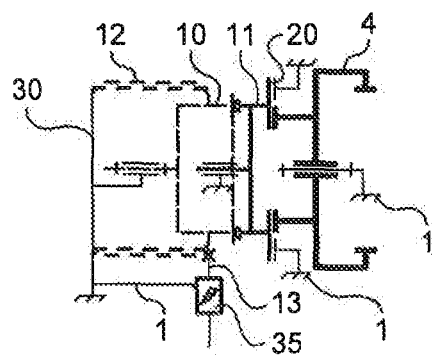
FIG. 2 is a kinematic diagram in plan view of the actuator.
Figure 3:
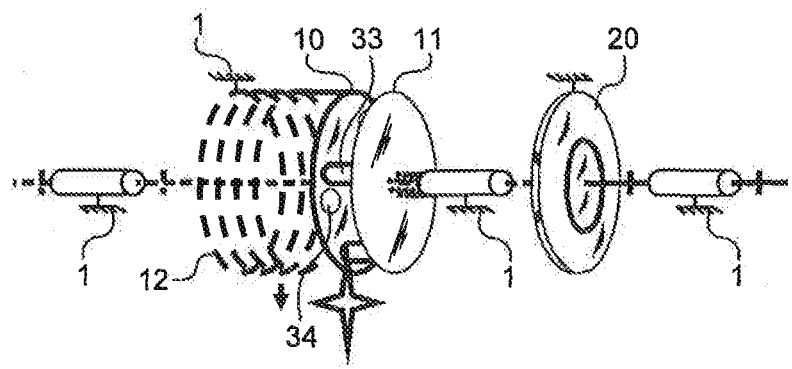
FIGS. 3 to 5 are fragmentary kinematic diagrams in perspective showing the de-blocking device respectively when deactivated, while being activated, and when activated.
Figure 4:
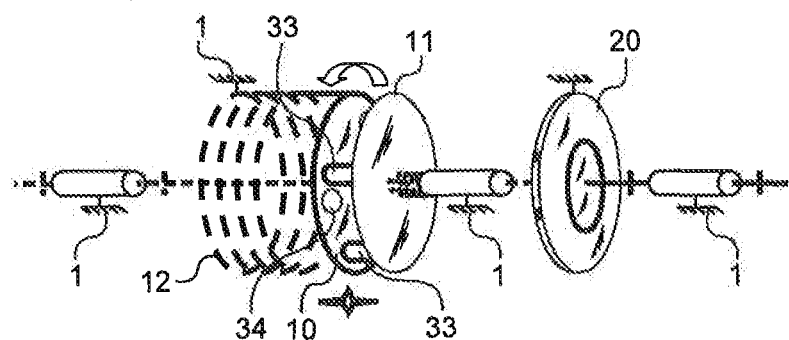
Figure 6A:
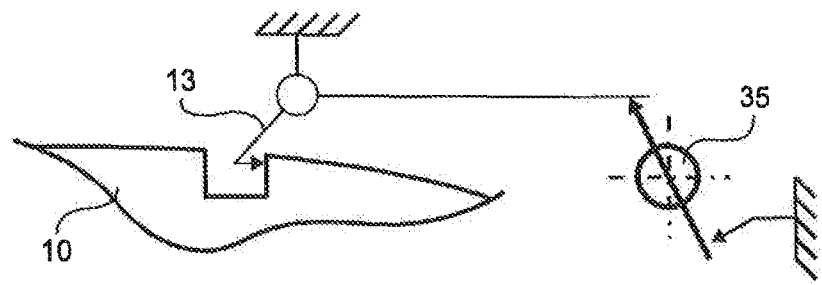
FIGS. 6a and 6b are fragmentary diagrammatic views showing the activation of the de-blocking device.
Figure 6B:
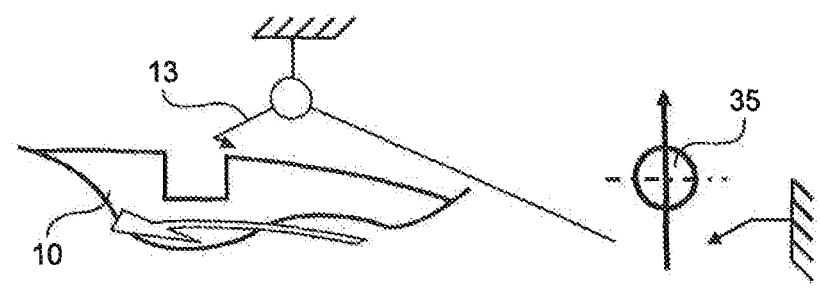
Figure 7:
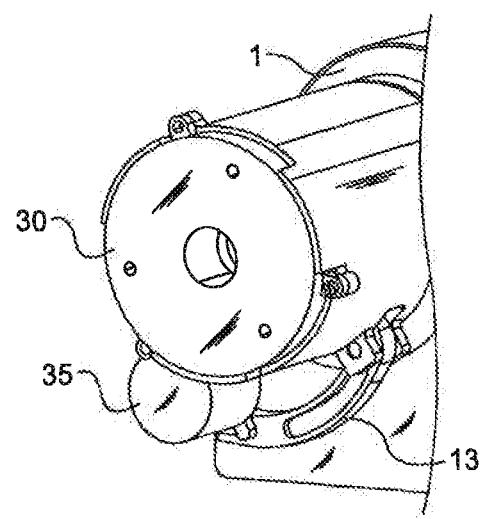
FIG. 7 is a fragmentary outside view in perspective of the means for activating the de-blocking device.

An electrically-controlled latch 13 is mounted on the frame 1 to hold the female plate 10 in its first position against, a force exerted by a torsion spring 12 surrounding the support shaft 31 and having one end fastened to the cover 30 and an opposite end fastened to the female plate 10. In this example, the latch 13 is in the form of a rocking lever having one end engaged in a peripheral notch in the female plate 10 and an opposite end actuated by a solenoid 35 (FIG. 6a). Actuating the lever that forms the latch 13 causes the latch 13 to be disengaged from the notch, thereby allowing the female plate 10 to rotate (FIG. 4 and FIG. 6b), In normal operation, the clutch plate 11 is in its blocking position and the female plate 10 is in its first position (FIGS. 1 to 3). The casing 4 is thus stationary in rotation relative to the frame 1.

In the event of the actuator blocking (where methods for detecting such blockages are known from elsewhere), the solenoid 35 is operated to disengage the latch 13 from the female plate 10. The female plate 10 is driven to pivot by the helical. spring 12 (FIG. 4) until the female plate 10 reaches its second position. The spacers 33 are then in register with the housings 34, and they penetrate into the housings 34 under drive from the helical spring 32 urging the clutch plate 11 towards the female plate 10 (FIG. 5). The casing 4 is then free to rotate relative to the frame 1, thereby leaving the control surface free to move under the action of another actuator or of external forces acting on the movable member. It should be observed that the forces are exerted for the most part by springs, so there is no need to use a powerful solenoid that would need to be bulky and that would be energy hungry.

The blocking device should be put back into its normal operation position manually during a maintenance operation.

Naturally, the invention is not limited to the embodiments described but covers any variant coming within the ambit of the invention as defined by the claims.

In particular, the latch, the solenoid, and the torsion spring may be replaced by a secondary actuator for reversibly moving the movable element between its two positions.

The gear reducer can be another type of gear train such an epicyclical gear reducer in which a satellite-holder is used as the first element of the anti-blocking device.

The structure of the actuator may be different from that described. The anti-blocking device may for example be enclosed in a unit fitted on the frame 1, the latch 13 may move by sliding rather than by rocking, the gear train may have a greater or smaller number of transmission elements than those described above.

The invention claimed is:

1. An electromechanical actuator comprising a frame having mounted thereon a rotary motor and a coaxial gear reducer having as an inlet an outlet shaft of the motor and as outlets a first element of an anti-blocking system and a ring coaxial with the outlet shaft of the motor and connected to a lever for operating a member that is to be driven, the gear reducer being mounted on the frame to pivot about the axis of the outlet shaft of the motor, the anti-blocking device being mounted on the frame and comprising a second element that is movable between a blocking position for blocking the first element in rotation relative to the frame, and a release position for releasing the first. element in rotation relative to the frame, the anti-blocking device including a holder element for holding the second element in the blocking position, and means for unblocking the holder element, the second element being urged towards the release position by a resilient element.

2. An actuator according to claim 1, wherein the gear reducer is a differential reducer and the first element has an annular portion with internal teeth for forming a stationary element of the gear train.

3. An actuator according to claim 1, wherein the second element is mounted to slide along a sliding direction coinciding with the outlet shaft.

4. An actuator according to claim 3, wherein the second element is a plate having a friction surface that is pressed against the first element and the frame so as to constrain them together in rotation when the second element is in the blocking position, and that is moved away from the frame and the first element when the second element is in the release position.

5. An actuator according to claim 4, wherein the holder element is mounted to pivot about the sliding direction between a first position in which at least one spacer secured to the second element spaces the second element from the holder element, and a second position in which the spacer is received in a housing of the holder element in such a manner that the second element and the holder element are moved towards each other, an electrically-controlled latch holding the holder element in its first position against a force exerted by a torsion spring.

6. An actuator according to claim 1, wherein the anti-blocking device includes a secondary actuator for reversibly moving the second element between its two positions.

7. An actuator according to claim 1, wherein the first element comprises an inner-toothed annular portion which is connected to the frame via at least one two-stage bearing.

* * * * *